United States Patent [19]

Hayakawa et al.

[11] Patent Number: 4,773,738
[45] Date of Patent: Sep. 27, 1988

[54] OPTICAL MODULATION DEVICE USING FERROELECTRIC LIQUID CRYSTAL AND AC AND DC DRIVING VOLTAGES

[75] Inventors: Naoji Hayakawa, Yokohama; Fumitaka Kan; Toshiaki Majima, both of Tokyo; Masanori Takenouchi, Atsugi; Ichiro Nomura, Tokyo; Mitsuru Yamamoto; Hidetoshi Suzuki, both of Atsugi, all of Japan

[73] Assignee: Canon Kabushiki Kaisha, Tokyo, Japan

[21] Appl. No.: 90,241

[22] Filed: Aug. 25, 1987

[30] Foreign Application Priority Data

Aug. 27, 1986 [JP] Japan .................. 61-199034
Jun. 18, 1987 [JP] Japan .................. 62-153110
Aug. 17, 1987 [JP] Japan .................. 62-204425

[51] Int. Cl.$^4$ ............................................. G02F 1/13
[52] U.S. Cl. ............................ 350/350 S; 350/333; 350/336
[58] Field of Search .............. 350/346, 333, 339 R, 350/350 S, 336

[56] References Cited

U.S. PATENT DOCUMENTS

| | | | |
|---|---|---|---|
| 4,139,273 | 2/1979 | Crossland et al. | 350/350 S X |
| 4,367,924 | 2/1983 | Clark et al. | 350/350 S X |
| 4,419,664 | 12/1983 | Crossland et al. | 350/350 S X |
| 4,563,059 | 1/1986 | Clark et al. | 350/350 S X |
| 4,598,978 | 7/1986 | Mourey et al. | 350/350 S X |
| 4,668,051 | 5/1987 | Mourey et al. | 350/350 S |

Primary Examiner—Stanley D. Miller
Assistant Examiner—Richard F. Gallivan
Attorney, Agent, or Firm—Fitzpatrick, Cella, Harper & Scinto

[57] ABSTRACT

An optical modulation device includes: a ferroelectric liquid crystal disposed between a pair of substrates; provision for applying an alternating voltage sufficient to render the ferroelectric liquid crystal turbid; and provision for superposing a DC voltage on the alternating voltage. A portion of the ferroelectric liquid crystal rendered turbid through the application of an alternating voltage is selectively caused to have an increased transmittance when superposed with a DC voltage.

21 Claims, 6 Drawing Sheets

OPTICAL MODULATION DEVICE USING FERROELECTRIC LIQUID CRYSTAL AND AC AND DC DRIVING VOLTAGES

FIELD OF THE INVENTION AND RELATED ART

The present invention relates to an optical modulation device applicable to a display panel, such as an optical shutter array, etc., particularly an optical modulation device using a ferroelectric liquid crystal.

Hitherto, an electrophotographic printer using a ferroelectric liquid crystal device as an optical modulation part has been proposed, e.g., by U.S. Pat. No. 4,548,476 and JP-A No. 60-107023.

A copy formed by such an electrophotographic printer has an image with two density levels, of ordinarily "white" and "black".

Incidentally, Clark et al have disclosed a chiral smectic liquid crystal device provided with a memory characteristic in U.S. Pat. Nos. 4,367,924 and 4,563,059. The chiral smectic liquid crystal device is known to form a first stable orientation state corresponding to, e.g., "white" of the two levels and a second stable orientation state corresponding to "black" in response to the direction of an electric field applied. Accordingly, the chiral smectic liquid crystal device causes rapid transition from white (or black) to black (or white) in response to application of voltages with different polarities so that it involves a problem that gradational display by voltage amplitude control is difficult, particularly under high speed driving.

On the other hand, an electrophotographic printer is required to have high speed driving more and more. For this reason, it becomes even more difficult to apply the above-mentioned chiral smectic liquid crystal device to a shutter array element for an electrophotographic printer to obtain a copy image with gradation.

On the other hand, U.S. Pat. No. 3,675,988 discloses a nematic liquid crystal device wherein one display region is allowed to have white and black regions in a controlled ratio, but the device is not used for providing a gradational image. Further, M. Geary, SID DIGEST (1985) p. 128 discloses the application of an AC voltage to a ferroelectric liquid crystal, but the application of the AC voltage is effected for bistabilization of the ferroelectric liquid crystal cell and not for providing a gradation.

SUMMARY OF THE INVENTION

Accordingly, an object of the present invention is to provide an optical modulation device having solved the above problems, particularly an optical modulation device for use in a shutter array device of a printer capable of providing an electrophotographic printer which can be driven at high speed and can provide a gradation, and also in a display panel.

Another object of the present invention is to provide an optical modulation device capable of providing a display panel with high contrast which can omit the use of a polarizer and an analyzer.

According to the present invention, there is provided an optical modulation device, comprising: a ferroelectric liquid crystal disposed between a pair of substrates; means for applying an alternating voltage sufficient to render the ferroelectric liquid crystal turbid; and means for superposing a DC voltage on the alternating voltage.

In a more specific aspect, the present invention provides an optical modulation device, comprising: a ferroelectric liquid crystal disposed between a pair of substrates; means for applying an alternating voltage sufficient to render the ferroelectric liquid crystal turbid; a matrix electrode arrangement comprising a plurality of scanning electrodes and a plurality of signal electrodes intersecting with the scanning electrodes; and means for applying a DC voltage at an intersection of a selected scanning electrode and at least one signal electrode.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

According to the present invention, the clarity of a liquid crystal cell is increased to provide an increased transmittance by superposing a DC bias on an AC voltage applied to the liquid crystal cell. As a result, the transmittance through an optical switch can be changed by controlling the DC bias. In the device of the present invention, no polarizer is used so that a high response speed is exhibited while retaining a high transmittance and without causing a lowering in contrast. In the device of the present invention, the electrode structure of the liquid crystal cell can be composed of a multilayer structure including a dielectric layer so that the DC bias can be independently applied, whereby the driving becomes easy.

Figure 1A:
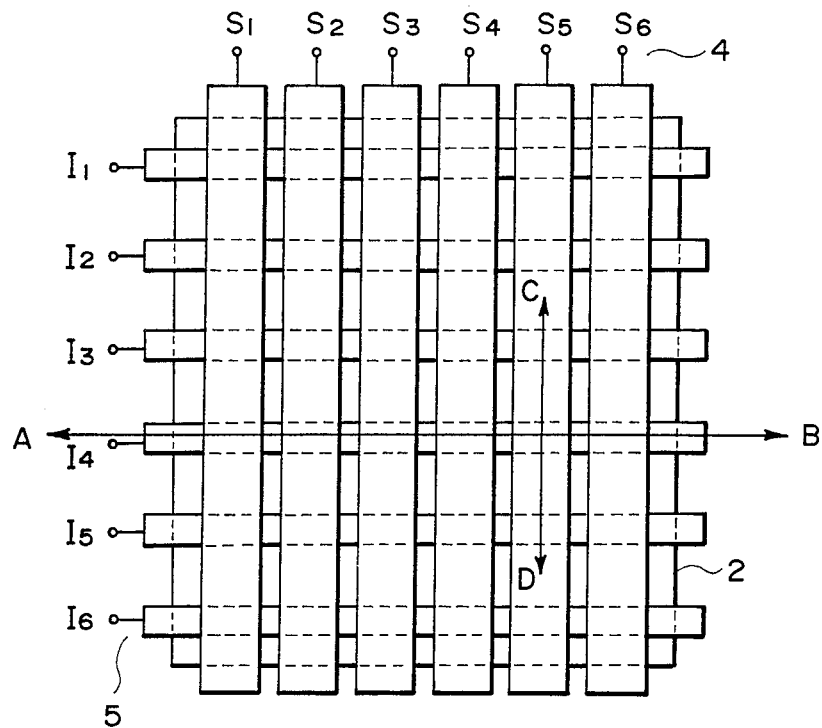
FIG. 1A is a plan view of an optical modulation device according to the present invention.
Figure 1B:
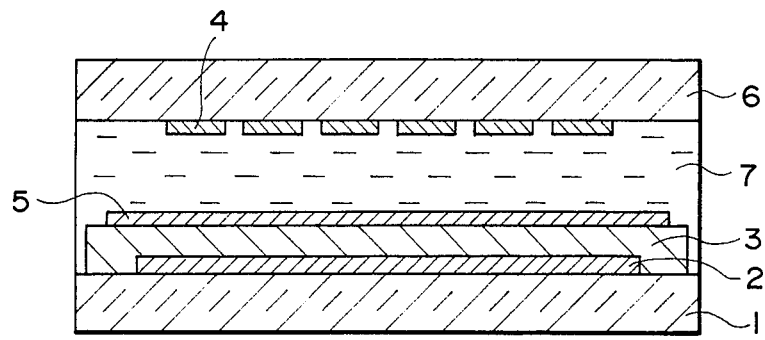
FIG. 1B is a sectional view thereof taken along the line A-B in FIG. 1A.

FIG. 1A is a plan view of a liquid crystal device according to the present invention used in an optical switch array, and FIG. 1B is a sectional view taken along the line A—B in FIG. 1A. The liquid crystal device shown in FIGS. 1A and 1B is a liquid crystal cell having a cell gap of 100 μm obtained through uniaxial alignment control treatment such as rubbing or oblique vapor deposition. The liquid crystal cell comprises two 1 mm-thick glass substrates 1 and 6 provided with ITO electrodes and a ferroelectric liquid crystal 7 disposed therebetween. In this particular embodiment, a ferroelectric liquid crystal 7 (chiral smectic C liquid crystal) such as MBRA-8 (4-O-(2-methyl)-butylresorcylidene-4'-octylaniline) showing a ferroelectric phase at room temperature under a supercooled state was used.

On a first glass substrate 1, an auxiliary electrode 2 of ITO was formed on the first glass substrate by vapor deposition, and the auxiliary electrode 2 was covered with a 50 μm-thick dielectric film 3 of glass (SiO$_2$) or plastic on which signal electrodes (I$_1$, I$_2$, . . . ) 5 of ITO were formed in the form of stripes. Further, on the second glass substrates 6, scanning electrodes (S$_1$, S$_2$, . . . ) 4 also of ITO were formed in the form of stripes.

Figure 2:
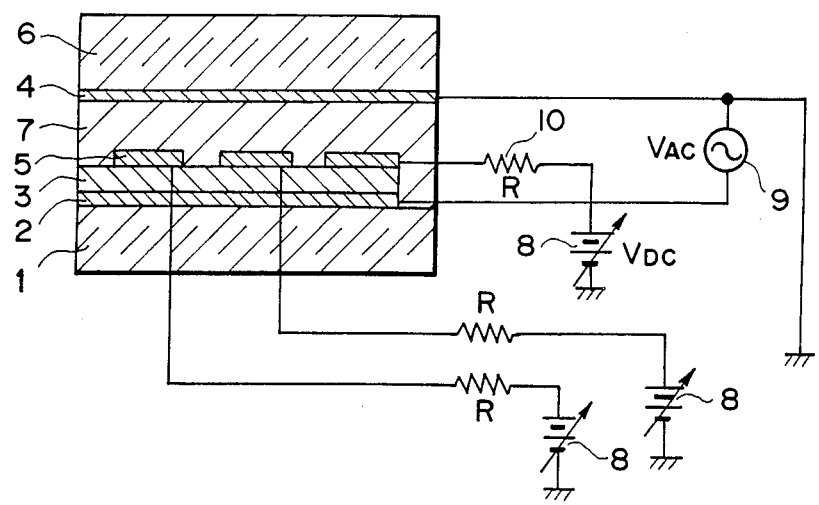
FIG. 2 is a schematic illustration of such an optical modulation device in combination with voltage-application means therefor shown in the form of a black diagram.

The liquid crystal device was driven in the following manner as shown in FIG. 2. More specifically, the scanning electrodes 4 were used as common electrodes, and an AC voltage was uniformly applied between the auxiliary electrode 2 and the scanning electrodes 4 by means of an AC voltage supply 9. Further, a DC voltage was applied to an arbitrary one of the signal electrodes 5 composed of stripe-form ITO films through a resistor R (10). The resistor R was used because an AC bias electric field is not substantially applied to the liquid crystal layer 7 due to a shielding effect if the signal electrodes 5 are of a low impedance. In order to effectively apply an AC bias electric field, it is preferred to connect a resistor R of 100KΩ to 10MΩ. When only an AC voltage is applied, the liquid crystal cell becomes turbid to assume a minimum transmittance. At this time, if a certain DC bias is applied to an intersection of a selected scanning electrode 4 and a selected signal electrode 5, the clarity of the intersection (pixel) is increased to provide an increased transmittance. Accordingly, if the DC bias is variably controlled by means of a variable DC supply, the transmittance through the optical switch can be changed.

The cell gap of the ferroelectric liquid crystal cell may generally be set to a range of 10 μm to 100 μm.

Figure 4:
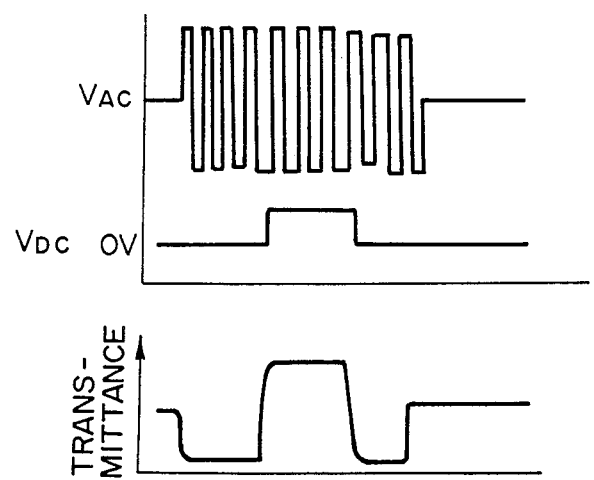
FIG. 4 is a time chart showing applied voltage signals and a change in transmittance in comparison.

FIG. 4 is a graph showing voltage waveforms applied in the embodiment and the resultant change in transmittance in comparison.

In the above embodiment, a contrast of 200:1 was obtained by superposing an AC voltage V$_{AC}$ with a frequency of 350 Hz and a peak voltage of 800 Vpp and a DC bias V$_{DC}$ of 100 V. Further, a high-speed optical response on the order of sub-milliseconds was realized.

Figure 3:
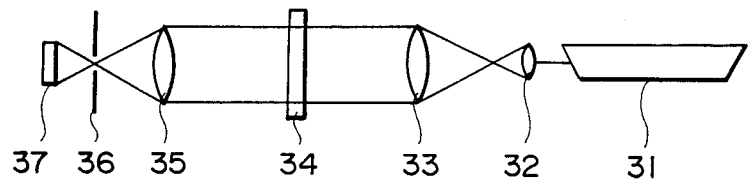
FIG. 3 shows an arrangement of an optical system for detecting a transmittance.

FIG. 3 shows an arrangement of an optical system by which the transmittance through the above optical switch is detected. In the system shown in FIG. 3, a test beam issued from a He-Ne laser 31 as a light source is passed through an expanding-and-collimating system including lenses 32 and 33 and incident on the optical switch 34 as a test piece. The light beam transmitted through the optical switch 34 is focused through a condenser lens 35 and a pin-hole 36 and detected by a silicon photosensor cell 37.

Figure 10:
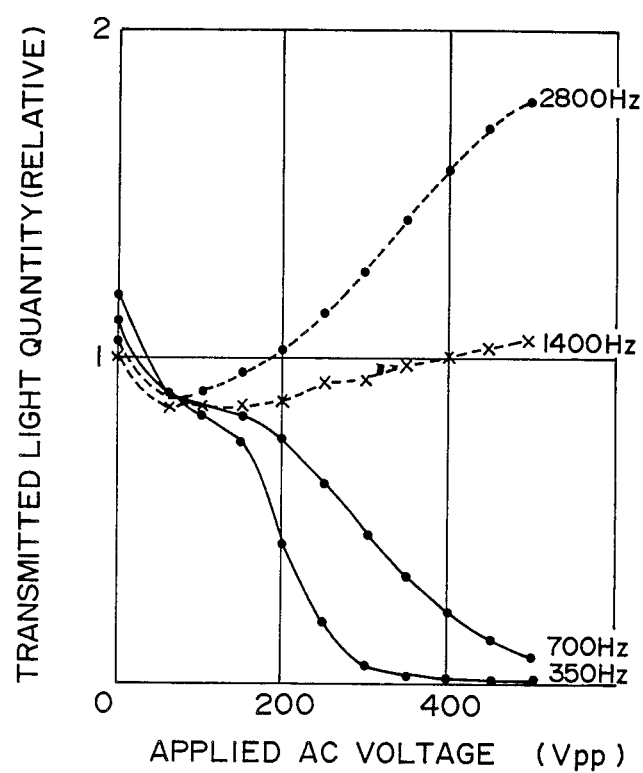
FIG. 10 is a characteristic chart showing relations between applied AC voltage and transmitted light quantity.

As shown in a characteristic chart shown in FIG. 10, when the transmitted light quantity is plotted versus the AC voltage applied to the liquid crystal cell with the transmitted light quantity under no electric field being taken as the standard (1) of a relative scale, the transmitted light quantity remains at nearly 1 at a frequency of 1400 Hz and approaches 2 at a frequency of 2800 Hz. In other words, the frequency for providing the liquid crystal with a turbidity is below about 1 KHz, and at a higher frequency, the voltage application rather increases the clarity. However, the saturation value changes depending on the cell thickness, so that the frequency of the AC voltage may generally be selected from the range of 200 Hz to 2 KHz.

In the device of the present invention, the AC voltage is substantially decreased because of capacitance division with the dielectric film 3, so that the magnitude thereof must be decreased by that much.

Figure 5:
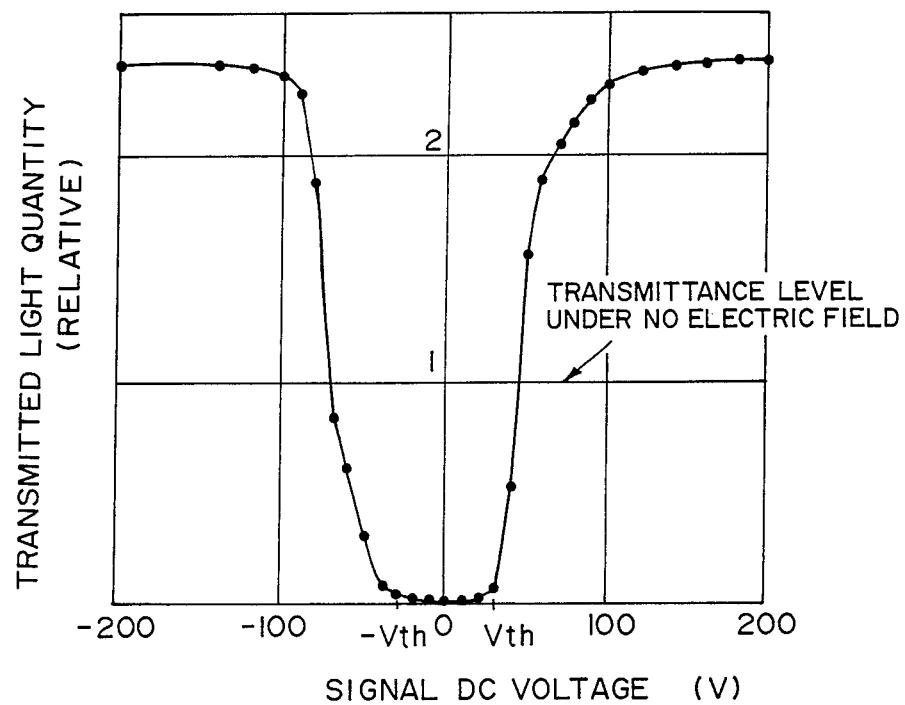
FIG. 5 shows a characteristic curve indicating the correlation of transmitted light quantity and transmittance.

FIG. 5 shows a characteristic curve showing a relation between the transmitted light quantity and the DC voltage signal when various DC voltage signals were superposed on an AC voltage with a frequency of 350 Hz and a voltage peak value Vpp of 800 volts. As is clear from FIG. 5, the increase in clarity of the liquid crystal cell caused by superposition of the DC voltage is almost saturated when the DC voltage exceeds ±100 V. Accordingly, in the driving system of the present invention, the voltage of the DC signal is in the range of −100 V to +100 V for a cell gap of 100 μm. However, if the cell gap is made thinner (e.g., 50 μm), the DC voltage signal may be lowered. Further, the AC voltage may be generally set in the range of 100 V to 1000 V in terms of a peak-to-peak voltage while it can vary depending on the kind of ferroelectric liquid crystal used and the cell gap.

The principle of the driving system adopted in the present invention has not been clarified as yet. For example, Hideshi Yoshida, Seiji Tamura and Masahiro Okabe, in 34th Joint Lecture relating to Applied Physics, Japan, made a publication as 30p-D-16 on Mar. 30, 1987, ". . . The sample was formed into multi-domains by applying low-frequency pulses and high-frequency pulses in superposition. A pulse was supplied to the sample to change the transmitted light quantity. The cell contained mixture of domains assuming a bright state and domains assuming a dark state. It is considered that the domain walls hindered propagation of polarity inversion along the extension so that the intermediate state was retained." This is considered to explain the above-mentioned phenomenon utilized in the present invention to some extent.

In the multiplexing driving used in the present invention, a scanning selection signal may be sequentially applied to the scanning electrodes 4, and in phase with the scanning selection signal, an information signal may be applied to the signal electrodes 5 so that the above-mentioned DC bias component may be applied to an intersection of a selected scanning electrode 4 and a selected signal electrode 4. Further, at this time, the above DC bias component may be set to a value corresponding to gradation data given to the respective pixels. For this purpose, an information signal comprising a peak value, a pulse duration or a number of pulses depending on given gradation data may be supplied to each pixel through a signal electrode 5.

Further, it is desirable to apply an AC voltage also to nonselected scanning electrodes 4.

Figure 8:
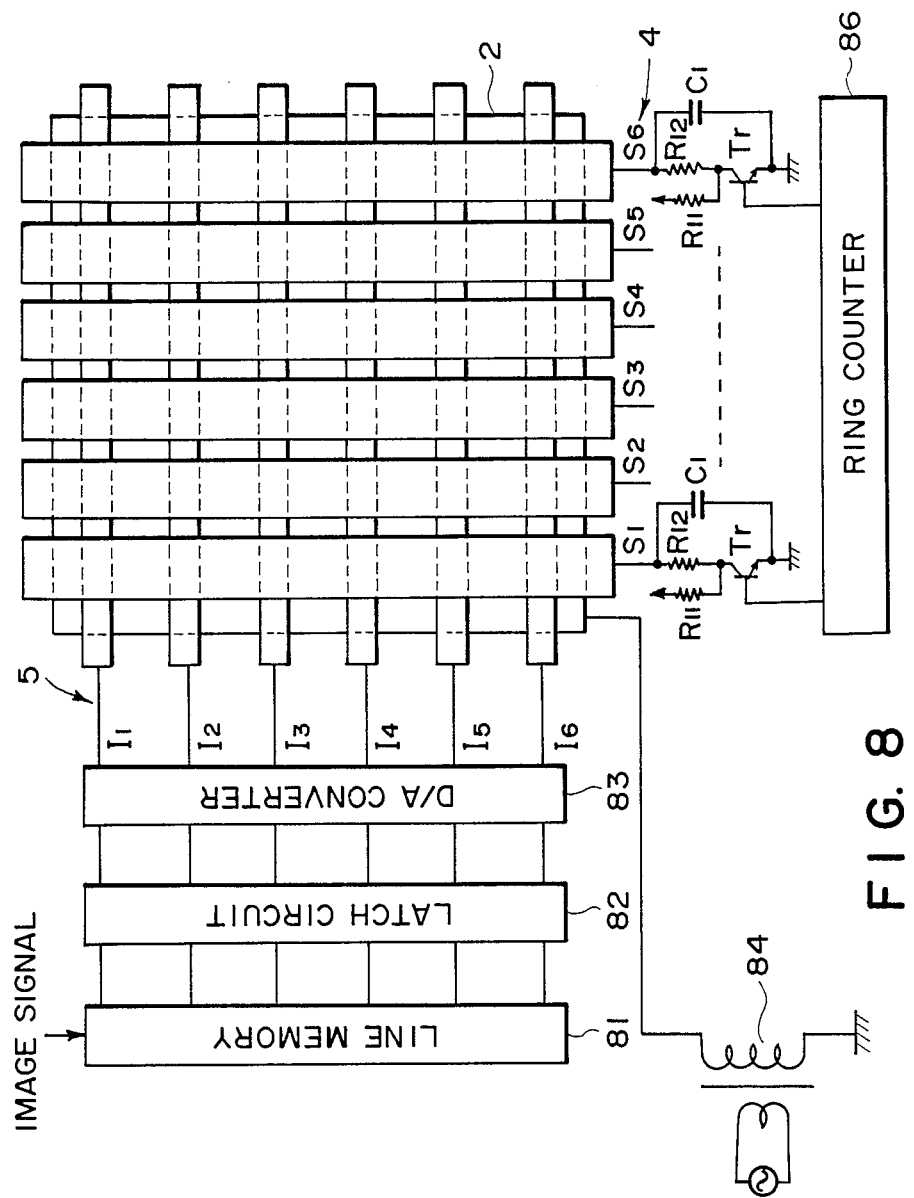
FIG. 8 is a block diagram of an optical modulation device.

FIG. 8 is a block diagram of a driving apparatus used in the present invention. Image signals are stored in a line memory circuit 81 and supplied through a latch circuit 82 to a D/A converter where they are subjected to digital/analog conversion to supply signal voltages V$_{ON}$ and V$_{OFF}$ selectively to signal electrodes 5. In the scanning driver circuit, there is provided a ring counter 86 provided with resistors $R_{11}$, $R_{12}$, a capacitor $C_1$ and a transistor Tr for each scanning electrode, whereby a voltage $V_1$ is applied to a selected scanning electrode and a voltage $V_2$ is applied to a nonselected scanning electrode. Further, the auxiliary electrode 2 is always supplied with an AC voltage from an AC power supply 84.

As a result, a voltage of $V_{ON}-V_1$ is applied to a selected pixel on a selected scanning electrode, and a voltage of $V_{OFF}-V_1$ is applied to a nonselected scanning electrode on the same scanning electrode. On the other hand, a voltage of $V_{ON}-V_2$ or $V_{OFF}-V_2$ is applied to pixels on a nonselected scanning electrode. The voltage $V_{ON}-V_1$ is set to a value exceeding the threshold voltage $\pm V_{th}$ shown in FIG. 5, and the voltages $V_{OFF}-V_1$, $V_{ON}-V_2$ and $V_{OFF}-V_2$ are set to a value not exceeding the threshold voltage $\pm V_{th}$. To this end, in the present invention, the peak values of voltages $V_{ON}-V_2$ and $V_{OFF}-V_2$ may be set to below ½, preferably below ⅓, of the peak value of the voltage $V_{ON}-V_1$ so as to prevent the occurrence of crosstalk.

Figure 9:
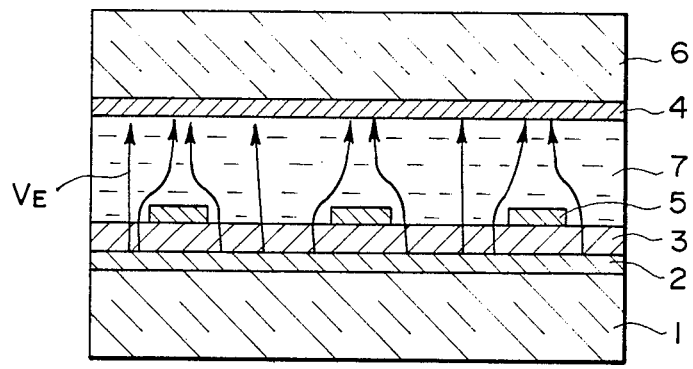
FIG. 9 is a sectional view taken along the line C-D in FIG. 1A.

In the present invention, if the width (L) of a signal electrode 5 is larger than the spacing (S) between adjacent signal electrodes, an AC electric field is not substantially applied to the ferroelectric liquid crystal 7 due to a sielding effect when a DC voltage is applied between a signal electrode and a scanning electrode 4. Accordingly, they are required to satisfy L≦S. More specifically, as shown in FIG. 9 which is a cross-sectional view taken along the line C-D in FIG. 1A, if the relation of L/S≦1 is satisfied, an electric field $V_E$ can go round to the liquid crystal layer 7. Further, if L/S is extremely small, the DC electric field cannot be easily applied to the liquid crystal layer 7, so that it is desirable to satisfy L/S>0.1.

In the above embodiment, MBRA-8 was used as a ferroelectric liquid crystal. However, there may also be used other ferroelectric liquid crystals as disclosed in, e.g., "LE JOURNAL DE PHYSIQUE LETTERS" 36 (L-69), 1975 "Ferroelectric Liquid Crystals"; "Applied Physics Letters" 36 (11) 1980, "Submicro-Second Bistable Electrooptic Switching in Liquid Crystals", "Kotai Butsuri (Solid State Physics)" 16 (141), 1981 "Liquid Crystal"; U.S. Pat. Nos. 4,561,726, 4,589,996, 4,596,667, 4,613,209, 4,614,609, 4,622,165, 4,639,089, etc.

More particularly, examples of ferroelectric liquid crystal compound usable in the present invention include decyloxybenzylidene-p'-amino-2-methylbutyl cinnamate (DOBAMBC), hexyloxybenzylidene-p'-amino-2-chloropropyl cinnamate (HOBACPC), 4-O-(2-methyl)butylresorcylidene-4'-octylaniline (MBRA 8), etc.

When a device is constituted by using these materials, the device may be supported with a block of copper, aluminum, etc., in which a heater is embedded in order to realize a temperature condition where the liquid crystal compounds assume an SmC*, SmH*, SmI*, SmF* or SmG* phase.

Figure 6:
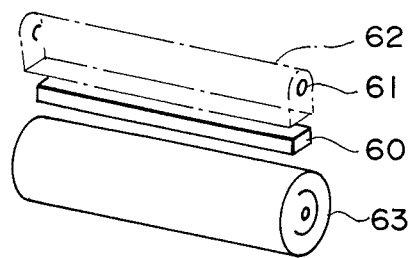
FIG. 6 is a schematic perspective view showing a fundamental construction of an electrophotographic printer using a shutter array device according to the present invention.

FIG. 6 is a schematic perspective view showing an optical system wherein an optical modulation signal is supplied to a light-receiving medium 63 such as an ordinary photosensitive drum for electrophotography by using an optical switch array device according to the present invention. The optical system includes an elongated light source 61 such as a fluorescent lamp or an LED array and a light-reflecting hood 62. It is possible to dispose an optical means such as a Selfor lens array (not shown) between the optical switch array 60 and the light-receiving medium 63.

In the optical switch array according to the present invention, the optical transmission state is controlled by modulating the transmitted light quantity basically for each pixel aperture.

Figure 7:
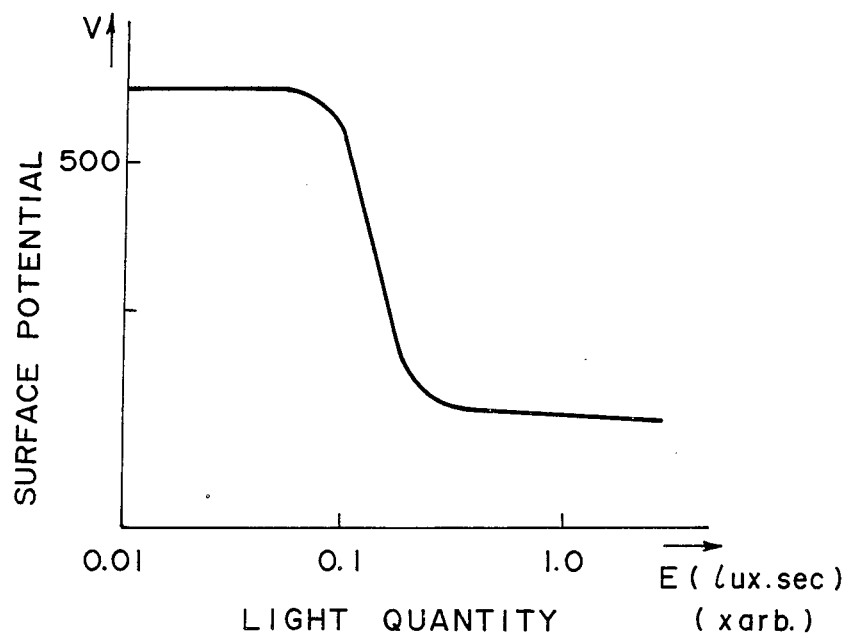
FIG. 7 is a graph showing a surface potential characteristic of a light-accepting member depending on exposed light quantity.

FIG. 7 is a graph showing a typical example of relationship between exposed light quantity E and surface potential V for an ordinary light-receiving member or photosensitive member such as Se, amorphous-Si and OPC (organic photoconductor). So as to fit the light quantity to a gradation range as shown in FIG. 7, the light source 61, the optical switch array 62 and/or the light-receiving member 63 may be driven.

As described hereinabove, according to the present invention, there is provided an optical modulation device using a ferroelectric liquid crystal adapted to an optical switch array and a display panel providing high contrast and high response speed.

Further, a liquid crystal optical device according to the present invention has an advantage that the use of a polarizer can be omitted to obtain an increased transmittance compared with a conventional liquid crystal optical devices, so that it can provide high contrast and a display of a wide visual field angle. Further, a liquid crystal optical switch obtained according to the present invention can effect very high-speed switching on the order of submilliseconds, so that it can provide gradational signals at a high density to a light-receiving member for use in an electrophotographic printer, etc., to provide good printed images.

Further, the liquid crystal device according to the present invention is formed with a relatively large cell gap in the range of 10 μm–200 μm, so that the cell designing therefor is easy compared with a ferroelectric liquid crystal panel proposed heretofore.

What is claimed is:

1. An optical modulation device, comprising:
  a ferroelectric liquid crystal disposed between a pair of substrates;
  means for applying an alternating voltage sufficient to render the ferroelectric liquid crystal turbid; and
  means for superposing a DC voltage on the alternating voltage.

2. A device according to claim 1, which comprises means for varying the magnitude of the DC voltage.

3. A device according to claim 1, which comprises means for controlling ON or OFF of the application of the DC voltage.

4. A device according to claim 1, wherein said alternating voltage has a frequency of 2 KHz or below.

5. A device according to claim 1, wherein said alternating voltage has a frequency of 200 Hz to 2 KHz.

6. A device according to claim 1, wherein said ferroelectric liquid crystal is a chiral smectic liquid crystal.

7. A device according to claim 6, wherein said ferroelectric liquid crystal is disposed in a layer having a thickness in the range of 10 μm to 200 μm.

8. An optical modulation device, comprising:
  a first substrate having successively thereon a first conductor film, a dielectric film and a second conductor film;
  a second substrate having thereon a third conductive film;
  a ferroelectric liquid crystal disposed between the first and second substrates;
  means for applying an AC voltage between the first and third conductor films; and means for applying a DC voltage between the second and third conductor films.

9. A device according to claim 8, which comprises means for varying the DC voltage applied between the second and third conductor films.

10. A device according to claim 8, wherein said second conductor film is disposed in a plurality insulated from each other.

11. A device according to claim 8, wherein said AC voltage has a frequency of 2 KHz or below.

12. A device according to claim 8, wherein said ferroelectric liquid crystal is a chiral smectic liquid crystal.

13. A device according to claim 12, wherein said chiral smectic liquid crystal is disposed in a layer having a thickness in the range of 10 µm to 200 µm.

14. An optical modulation device, comprising:
a ferroelectric liquid crystal disposed between a pair of substrates;
means for applying an alternating voltage sufficient to render the ferroelectric liquid crystal turbid;
a matrix electrode arrangement comprising a plurality of scanning electrodes and a plurality of signal electrodes intersecting with the scanning electrodes disposed on the inner sides of said pair of substrates, respectively; and
means for applying a DC voltage at an intersection of a selected scanning electrode and at least one signal electrode.

15. A device according to claim 14, wherein one of said pair of substrates is successively provided thereon with an auxiliary electrode covering the whole area or a prescribed region of the substrate, a dielectric film, and first stripe electrodes; the other substrate is provided thereon with second stripe electrodes; and the alternating voltage is applied between the auxiliary electrode and the second stripe electrodes.

16. A device according to claim 15, wherein said first stripe electrodes constitute the signal electrodes and said second stripe electrodes constitute scanning electrodes.

17. A device according to claim 16, wherein said first stripe electrodes are disposed to have a width which is smaller than a spacing between an adjacent pair of the first stripe electrodes.

18. A device according to claim 16, wherein said signal electrodes are supplied with pulse voltage signals having a peak value, a pulse duration or a number of pulses depending on given gradation data.

19. A device according to claim 14, wherein said alternating voltage has a frequency of 2 KHZ or below.

20. A device according to claim 14, wherein said ferroelectric liquid crystal is a chiral smectic liquid crystal.

21. A device according to claim 20, wherein said chiral smectic liquid crystal is disposed in a layer having a thickness in the range of 10 µm to 200 µm.

* * * * *

UNITED STATES PATENT AND TRADEMARK OFFICE
CERTIFICATE OF CORRECTION

PATENT NO. : 4,773,738
DATED : September 27, 1988
INVENTOR(S) : NAOJI HAYAKAWA, ET AL.

Page 1 of 2

It is certified that error appears in the above-identified patent and that said Letters Patent is hereby corrected as shown below:

AT [56] IN REFERENCES CITED

"2/1983  Clark et al." should read
--1/1983  Clark et al.--.

COLUMN 2

Line 26, "black" should read --block--.

COLUMN 3

Line 19, "substrates 6," should read --substrate 6,--.

COLUMN 4

Line 54, "signal electrode 4." should read --signal electrode 5.--.

COLUMN 5

Line 11, "scan-" should read --pixel--.
Line 12, "ning electrode" should be deleted.
Line 27, "sielding" should read --shielding--.
Line 52, "methyl)butylresorcylidene-" should read --methyl)-butylresorcylidene- --.
Line 68, "Selfor" should read --Selfoc--.

COLUMN 6

Line 23, "a" should be deleted.
Line 63, "conductive" should read --conductor--.

UNITED STATES PATENT AND TRADEMARK OFFICE
CERTIFICATE OF CORRECTION

PATENT NO. : 4,773,738

DATED : September 27, 1988

INVENTOR(S) : NAOJI HAYAKAWA, ET AL.   Page 2 of 2

It is certified that error appears in the above-identified patent and that said Letters Patent is hereby corrected as shown below:

COLUMN 7

Line 7, "a plurality" should read --as a plurality of stripe electrodes--.

Signed and Sealed this

Twenty-seventh Day of June, 1989

Attest:

DONALD J. QUIGG

Attesting Officer   Commissioner of Patents and Trademarks